Dec. 18, 1951 R. P. HARSHBERGER 2,578,801
EPICYCLIC MECHANISM
Filed June 18, 1947 3 Sheets-Sheet 1

INVENTOR
RUSSELL P. HARSHBERGER
BY
ATTORNEY

Dec. 18, 1951 R. P. HARSHBERGER 2,578,801
EPICYCLIC MECHANISM
Filed June 18, 1947 3 Sheets-Sheet 2
FIG. 5.
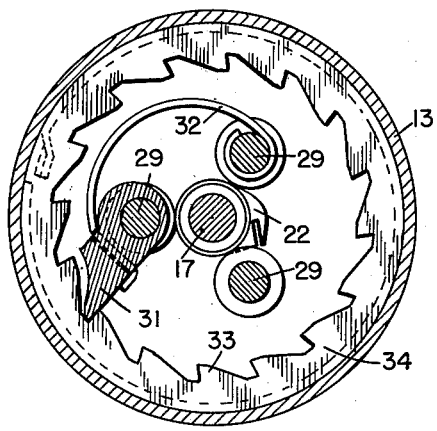
FIG. 9.
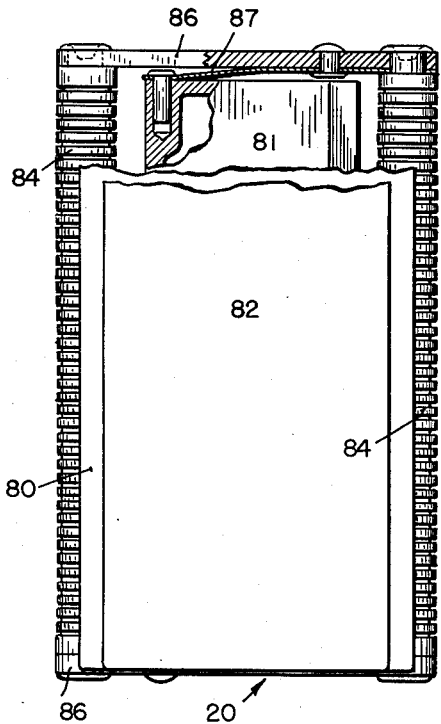
FIG. 6.
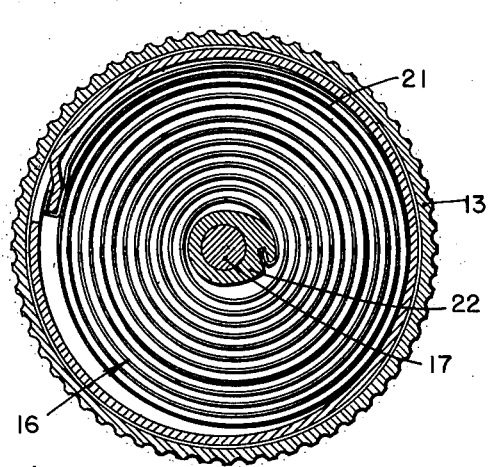
FIG. 11.
FIG. 8. FIG. 7. FIG. 10.
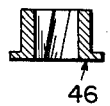  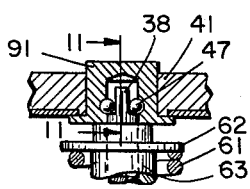
INVENTOR
RUSSELL P. HARSHBERGER
BY
ATTORNEY Dec. 18, 1951     R. P. HARSHBERGER     2,578,801
EPICYCLIC MECHANISM Filed June 18, 1947     3 Sheets-Sheet 3

INVENTOR
RUSSELL P. HARSHBERGER
BY
ATTORNEY

Patented Dec. 18, 1951

2,578,801

UNITED STATES PATENT OFFICE 2,578,801

EPICYCLIC MECHANISM

Russell P. Harshberger, Altadena, Calif.

Application June 18, 1947, Serial No. 755,405

16 Claims. (Cl. 74—798)

The present invention relates to power-transmitting mechanisms in general and particularly to a compact epicyclic mechanism adapted to transmit power with a minimum of frictional loss. More specifically the invention comprises an epicyclic mechanism designed to occupy a minimum of space and to transmit rotary power with an increase in rotational speed. A particular application of the invention comprises its use in mechanically vibrated razors, although it is to be understood that it is adapted for other uses, the described application being only exemplary.

In many power transmission applications it is necessary to transmit power with a minimum of loss and by means which are both compact and light. Usually such uses involve prime movers of limited capacity. Efficient transmission means capable of transmitting small amounts of power with minimum frictional loss and simultaneously increasing rotational speed have been developed incorporating cooperating and interrelated gears, as for example the construction of applicant's earlier Patent 2,056,186 and that of the patent to Sussman 2,249,441. Such constructions satisfactorily perform the intended function but have two serious defects in that use inevitably produces wear in the bearings and gear parts, resulting in undesirable play, noise and increase in frictional losses. By comparison, in constructions in which relatively large amounts of power are being transmitted and the frictional losses are not so important the same degree of care need not be exercised in maintaining the very close manufacturing tolerances. Additionally, the increased size of the parts makes possible the inclusion of take-up means in their construction. In the small applications, however, in which the size of the parts and the power transmitted is quite small friction increase due to wear and misalignment become exceedingly important.

The power transmission constructed in accordance with the present invention eliminates two of the serious defects which have characterized the prior devices in the same field. Gearing with teeth has been eliminated, and with it the necessity for close tolerances which result in high costs. Wear is eliminated as a factor by providing automatic take-ups which continuously act to take up wear as it takes place and without in any way changing the operating characteristics of the mechanism. The mechanism is simple in its construction, can be made more economically than prior devices and is characterized by its long life.

It is an object of the present invention to provide a new and improved epicyclic mechanism of the type adapted to function satisfactorily and to transmit power with a minimum of frictional loss in all angular positions.

It is a further object of the invention to provide an improved epicyclic mechanism in which rotary power is transmitted with a minimum of frictional loss and with an increase in the speed of rotation.

A still further object of the invention is to provide a power transmission mechanism incorporating a plurality of epicyclic roller trains incorporating automatic take-up to compensate for changes due to wear and temperature variations.

Still another object of the invention is to provide an epicyclic mechanism embodying a plurality of steps through which rotary power is transmitted with an increase in speed of rotation and with a minimum of frictional loss.

Still another object of the invention is to provide speed-increasing power transmission mechanism in which a plurality of individually rotatable speed-increasing units are maintained in operative relationship by their own rolling contact with one another.

A still further object of the invention is to provide a power-transmitting, speed-increasing epicyclic mechanism in which the various trains are aligned by their rolling contact with each other and with a fixed enclosing annulus.

A further object of the invention is to provide an epicyclic mechanism in which sun rollers are loosely mounted for rotation in their planet carriers.

A further object of the invention is to provide a new and improved vibratory razor including improved vibrating means.

These and other more specific objects will appear upon reading the following specification and claims and upon considering in connection therewith the attached drawings to which they relate.

Referring now to the drawings in which preferred embodiments of the invention are disclosed:

Figure 1:
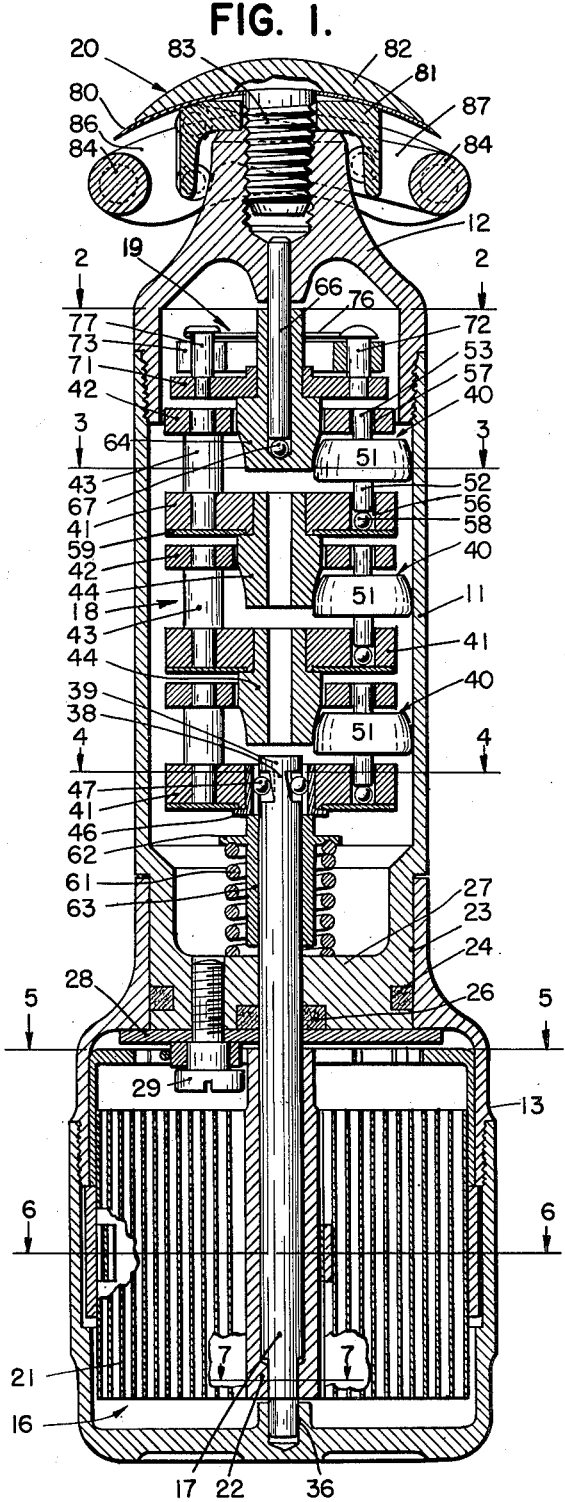
Figure 1 is a longitudinal section through a vibrating razor embodying epicyclic mechanisms constructed in accordance with the present invention.
Figure 2:
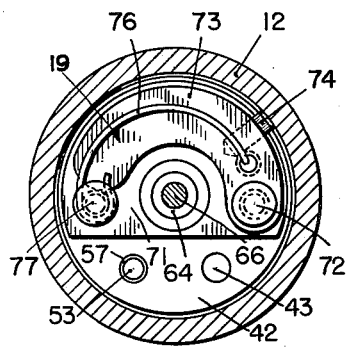
Figure 2 is a transverse section upon the line 2—2 of Figure 1 and shows the rotary vibrator governor.
Figure 3:
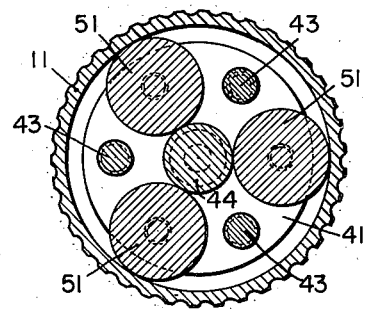
Figure 3 is a transverse section upon the line 3—3 through the epicyclic rollers.
Figure 12:
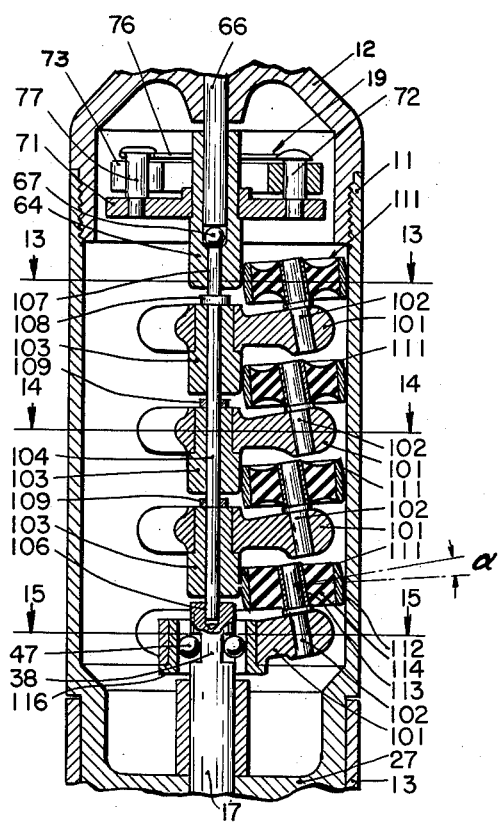
Figure 13:
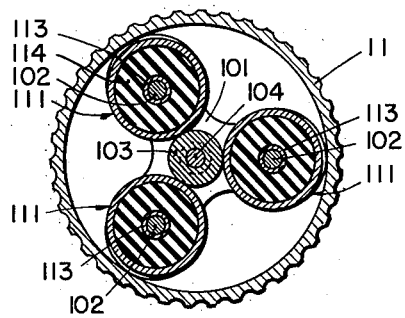
Figure 14:
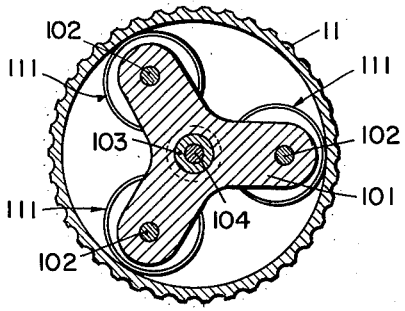
Figure 15:
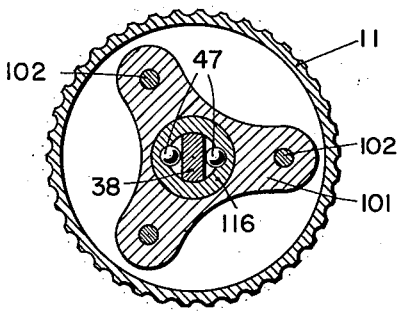
Figure 16:
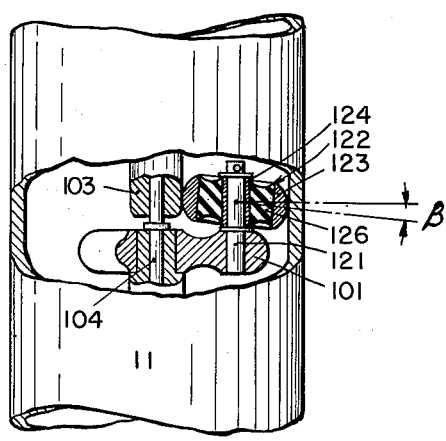

4—4 of Figure 1 and discloses the loose mounting of the roller shafts in the carrier bearings;

Figure 5 is a transverse section upon the line 5—5 of Figure 6 and discloses the spring-locking pawl arrangement;

Figure 6 is a transverse section through the spring motor upon the line 6—6 of Figure 1;

Figure 7 is a section upon the line 7—7 of Figure 1;

Figure 8 is a transverse section through the slotted driving cup through which power is initially received by the epicyclic mechanism;

Figure 9 is an end view of the operative end of the razor incorporating the present invention;

Figure 10 is an illustration of the modified driving connection between the motor shaft and the epicyclic mechanism;

Figure 11 is a section upon the line 11—11 of Figure 10 and shows the modified driving cup embodied in the construction of Figure 10;

Figure 12 is a partial longitudinal section through a second preferred embodiment of the epicyclic power transmission mechanism comprising the present invention embodied in a razor of the type illustrated in Figures 1 and 9;

Figure 13 is a transverse section through the epicyclic planet rollers upon the line 13—13 of Figure 12;

Figure 14 is a transverse section through the first planet carrier upon the line 14—14 of Figure 12;

Figure 15 is a transverse section upon the line 15—15 of Figure 12 and shows the connection between the motor shaft and the first carrier of the epicyclic mechanism constructed in accordance with the second embodiment of the invention; and Figure 16 is a partial sectional view through a third preferred embodiment basically similar to the second embodiment illustrated in Figures 12 to 15, inclusive, but differing therefrom in that the axis of rotation of the planet rollers is parallel to the axis of rotation of the planet carriers.

Referring again to the drawings and to Figures 1 to 8, inclusive, in particular, an epicyclic mechanism constructed in accordance with the first preferred embodiment of the invention is illustrated embodied in a vibratory razor actuated by a spring motor of the hand-wound type. The razor is seen to comprise a body including a central tubular casing 11, to one end of which is threaded a head 12, and to the opposite end of which is secured a handle 13, relatively rotatable with respect to the body or casing 11 and housing and actuating spring motor as will be hereinafter described. The spring driving motor, indicated generally by the reference character 16, is positioned within handle 13 with its shaft 17 extended into casing 11 in which the epicyclic mechanism is located, being indicated generally by the reference character 18. A rotary vibrator-governor, indicated generally by the reference character 19, is positioned within head 12 at the opposite end of the mechanism, while attached to the outer end of the head is a blade-mounting unit, indicated generally by the reference character 20.

Referring first to the motor unit 16 and its related mounting means, the motor is seen to comprise a coiled flat spring 21 fixedly secured at its inner end to a sleeve 22 which is itself fixed to the motor shaft 17 by virtue of the non-circular sections illustrated in Figure 7. The handle 13 which forms the motor casing is seen to be reduced at its forward end and rotatably seated upon the reduced rearward surface 23 of tubular casing 11. Lubricating seals 24 and 26 provide lubrication for surface 23 and for motor shaft 17 where it extends through the end wall 27 of casing 11, and also make the interior of casing 11 water tight. Longitudinal separation of the handle 13, which may be made in two threaded telescoping parts as illustrated, if preferred, and casing 11 is prevented by the presence of a locking plate 28 secured to casing end wall 27 by one or more screws 29.

To enable motor spring 21 to be wound means are provided by which the hollow handle 13 is permitted rotation under a manual force in one direction but is prevented from rotation in the opposite direction. These means comprise a pawl 31 pivoted upon a screw 29 and urged by a spring 32 into engagement with the teeth 33 of an encircling circular rack 34 fixed with respect to the handle 13. The teeth 33 are contoured as to permit the rack and the handle to rotate in one direction, the pawl sliding over the teeth, but upon the handle being released the pawl engages the teeth and rotation in the opposite direction is prevented.

The motor shaft 17 is rotatively positioned at its rearward end within a bearing 36 in handle 13 and is seen to extend forwardly therefrom through the end wall 27 of casing 11 to be formed at its end as a helically extending wall 38 and an end cap 39.

The epicyclic mechanism 18 previously referred to is positioned within casing 11 and in the first embodiment is formed of three epicyclic roller trains 40 which are identical except as pointed out specifically. Each train 40 comprises a planet carrier formed of spaced circular plates 41 and 42 rigidly connected by spacing pins 43 arcuately arranged around the longitudinal central or major axis corresponding to an extension of the motor shaft 17. With the exception of the roller train adjacent the end of motor shaft 17 the plate 41 of each train carries a sun roller 44, and in that case it carries a slotted driving cup 46. The latter is connected to the drive shaft 17 by spaced balls 47 of a size to fit in the slots of the cup 46 and positioned upon opposite sides of the helical wall 38. In the preferred form the slots in cup 46 extend helically, but it is important that the relationship between the wall 38, the balls 47 and the slots in the cup 46 be such that the cup, and so the first train of which it is a part, is permitted longitudinal displacement.

Each roller train 40 includes three arcuately spaced planet rollers 51 provided upon their opposite sides with stub shafts 52 and 53 rotatably seated in sleeve bearings 56 and 57 positioned, respectively, in the plates 41 and 42. The bearings 56 and 57 are larger than the stub shafts 52 and 53 positioned therein so that each roller 51 is permitted an appreciable radial displacement relative to the aforementioned longitudinal axis, but the presence of the aligning bearings at each side of the roller prevents tilting and binding. Within and at the end of each bearing 56 is positioned a thrust ball 58 abutting the end of stub shaft 52 upon one side and a fixed plate 59 upon its opposite side.

Planet rollers 51 are sized as to rotate in contact with the finished inner surface of tubular casing 11 and upon the surface of an adjacent sun roller 44. The latter is formed with an outwardly curved surface, the diameter of which increases with the distance from the motor shaft 17. The rollers 51 are also formed with an outwardly curved surface, the contour of which is such that the axial displacement of a roller 51 forwardly in casing 11 causes it to be cammed outwardly by the contour of the cooperating sun roller 44 toward the enclosing inner surface of casing 11 upon which it will, accordingly, exert greater pressure. An axial force at all times seeking to accomplish this result is exerted by the coil spring 61 concentric to drive shaft 17. One end of spring 61 abuts the casing end wall 27 while its opposite end exerts an axial force upon a flange 62 formed on the shaft-enclosing sleeve 63. The inner end of sleeve 63 abuts the outer face of driving cup 46 and exerts a force thereon and through it upon the first roller train, and so all subsequent roller trains, directed toward the head end of the mechanism. The thrust exerted by spring 61 is complemented by the axial component of the thrust exerted by the helical wall 38 of shaft 17 through the balls 47 and upon the helical grooves in driving cup 46. This axial thrust is in the same direction as that exerted by the spring 61 and, obviously, is greatest when the driving force is greatest. The entire thrust is transmitted in the case of each roller train through the plate 41, and specifically its thrust plate 59 to the balls 59 abutting the end of stub shaft 52 carried by each roller 51. The planet roller 51 is itself forced axially against the contoured surface of sun roller 44 which directly transmits the force to the carrier plate 41 to which it is connected. At the same time, of course, each roller 51 is forced outwardly by the contacted sun roller and against the inner surface of casing 11.

The planet rollers 51 forming a part of the roller train 40 nearest the head end of the razor abut a final sun roller, indicated by the reference character 64, which is exteriorly contoured in the manner of sun rollers 44. Instead of being mounted to the plate of a planet carrier as in the case of rollers 44 roller 64 is rotatably mounted upon a fixed governor-supporting shaft 66, and is interiorly spaced from the inner end of the roller by a thrust ball 67. The governor unit 19, comprising a governor plate 71, is fixedly secured for rotation with sun roller 64, the plate pivotally supporting upon a rivet 72 a weight 73 carrying a friction shoe 74, the two parts being normally spring-pressed inwardly by a spring 76 carried by a pin 77. The entire governor unit 19 is unbalanced relative to its axis of rotation and upon reaching a predetermined rotational speed vibrates the supporting structure at the desired frequency and amplitude. Its own speed of rotation is limited as the weight 73 flies outwardly and the friction shoe 74 frictionally engages the inner surrounding surface of the head 12.

The mounting unit 20 for the razor blade 80 is positioned forwardly of the head 12 and comprises a blade-centering bed 81 and a clamping head 82 provided with a threaded center pin 83 seated threadedly in the inner end of head 12. Blade 80 is clamped between clamping head 82 and bed 81 in the usual manner common to safety razor blades of the double edged type and is removable from its operative position illustrated by unscrewing pin 83 from its seat in head 12, whereupon the clamping head and the bed can be separated and the blade displaced. In a manner forming no part of the present invention, but which has proven desirable in vibrating razors of this type, parallel guards 84 are provided at the sides of the edges of blade 80. The guards are connected by end members 86 which are themselves connected by flat springs 87 to the bed 81 to provide for limited longitudinal displacement.

Figure 4:
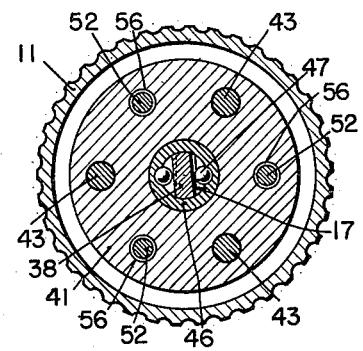
Figure 4 is a transverse section upon the line

In place of the driving connection between the motor shaft 17 and the plate 41 of the first roller train, as illustrated in Figures 1, 4 and 8, a modified connection of the type illustrated in Figures 10 and 11 may be substituted if desired. In the form there illustrated the driving cup 46 is replaced by a similar cup 91 closed at its inner end and formed with diametrically spaced hemispherical recesses 92 in place of the helical groove of the first embodiment. The driving motor shaft is again provided with the helically extending wall 38 reaching into the central recess of the cup, but the end cap 39 at the shaft end has been eliminated. Upon rotation of the shaft 17 an axial thrust is given to the balls 47 by the helical wall 38 and is transmitted directly to the cup 91 as the balls are permitted no axial or longitudinal movement.

The operation of the first described embodiment of the invention is as follows: Spring motor 16 is wound by turning the handle 13 which rotates relative to the tubular casing 11 to effect the tightening of the spring 21. As described, the spring cannot unwind by turning the enclosing handle 13 in the opposite direction by virtue of the presence of the locking pawl 31 and the cooperating enclosing rack 34. The winding operation stores energy in spring 21 effective to produce the rotation of shaft 17, a movement directly transmitted through the power-transmitting balls 47 to the plate 41 of the first roller train. That train rotates with shaft 17 and is forced axially therefrom and toward the head 12 by the axial component of the thrust as transmitted through the balls 47 supplemented by the axial thrust of the non-rotating coil spring 61 acting through the sleeve 63. As the first roller train rotates the planet rollers 51 thereof roll in contact with the inner surface of the casing 11 and also in contact with the contoured surface of the centrally positioned sun roller 44 at the second train. This first sun roller is thereupon rotated at a speed greater than the speed of the rotation of driving shaft 17 by a factor determined by the ratio of the length of the inner circumference of casing 11 to the length of its own outer circumference at the point the rollers 51 contact.

The rotation of first sun roller 44 is transmitted to its carrying plate 41 of the second roller train in which the action is repeated, the rollers 51 thereof transmitting their rotating force to the second sun roller 44 which rotates at a higher speed. The sun roller 64 is finally rotated and at the highest rotational speed at the forward end of the mechanism. The axial thrust developed by the rotation of shaft 17 and as supplemented by that of the spring 61 is transmitted through each roller train, the balls 58 contacting stub shafts 52 to force the connected rollers 51 forwardly to wedge them between the surrounding interior surface of casing 11 and a cooperating sun roller 44. As the surfaces of planet rollers 51 and sun rollers 44 are contoured to cam the rollers 51 outwardly as they are advanced forwardly, it is evident that dimensional changes due to temperature changes or to wear in either the planet rollers 51 or in the sun rollers 44 will be compensated for as it takes place by an axial shifting under the action of the described axial forces. Radial shifting of the planet rollers 51 is permitted by the loose fit of their shafts 52 and 53 in their bearings 56 and 57. This cooperative take-up effect takes place at each set of planet rollers and it is to be noted that the axial thrust which is available to cam rollers 51 outwardly is greatest nearest the driving shaft 17, the force being dissipated as it is transmitted through the successive roller trains by virtue of the friction existing between the rollers and the surfaces with which they contact. This is desirable inasmuch as the greatest rolling pressure is to be preferred upon those rollers traveling the slowest speeds, that is, nearest the actuating motor.

The rotating force, now having a rotational speed many times greater than that of the shaft 17, is finally transmitted as described to the last sun roller 64 connected to the governor plate 71. Roller 64 cannot advance longitudinally, being positioned by the thrust ball 67. The governor 19, which is also the vibrator by virtue of its inherent unbalance, is rotated at a speed which, in a preferred design, may be as much as 1500 times the speed of the shaft 17, and as a result of its rotation the head end of the unit is vibrated. Should there be a tendency to exceed the predetermined speed of rotation the governor weight 73 moves outwardly against the retaining force of its spring 76, its friction shoe 74 moving into contact with the surrounding surface of head 12, whereupon the speed of rotation is decreased. In the use disclosed the vibration of the head 12 is transmitted directly to the blade 80 which is moved over the user's face, the vibratory motion aiding in the cutting action by providing a transverse longitudinal movement.

Referring now to Figures 12 to 15, inclusive, a second preferred embodiment of the invention is illustrated which is fundamentally like that previously described in all respects except those hereinafter specifically referred to. In the first described embodiment the planet rollers were wedged between the sun rollers and the surrounding casing, and the alignment of the roller train was dependent upon the interfitting relationship existing between the rollers, there being no true supporting shaft. An axial displacement and shifting of the planet rollers was relied upon to compensate for any wear which might take place. In the present embodiment of the invention the epicyclic mechanism is illustrated as including four roller trains, each comprising a planet carrier 101 from which extends a plurality, three in the form illustrated, of fixed stub shafts 102. In the case of each carrier 101 excepting only that nearest the drive shaft 17, a central sun roller 103 is fixed relative thereto and rotatably supports it upon a longitudinal shaft 104 rotatably seated at one end in a seat 106 in the end of motor shaft 17 and at its opposite end in a seat 107 formed in the end of final sun roller 64, abutting at that point the thrust ball 67 which also abuts the governor-supporting shaft 66. A fixed flange 108 abuts the sun roller 103 of the foremost planet carrier 101 and flanges or rings 109 loosely mounted upon shaft 106 space the remaining sun rollers, providing a relationship in which all but the planet carrier 101 nearest the head 12 can be advanced forwardly.

Three planet rollers 111 are mounted upon each planet carrier 101, being equally spaced arcuately therearound and supported upon the pins or shafts 102. Each roller comprises an outer rim, the exterior surface 112 of which is curved, and an inner metallic sleeve 113 spaced from the rim by a resilient body 114.

The angular disposition of the planet roller shafts 102 makes it impossible for the planet rollers, because of their diameters, to rotate in planes normal to their shafts. Instead each roller 111 is deflected in the sense of being tiled from its normal position by being wedged between the enclosing casing 11 and its cooperating sun roller. The deflection takes place, of course, within the resilient central portion 114. As a result of the resilient nature of central portions 114 the planet rollers at all times seek to move into their normal positions and in doing so exert pressure against the surfaces which they contact, that is, against the inner surface of casing 11 and the surface of the sun rollers. It is this pressure which provides the necessary frictional contact at all times and which takes up wear as it occurs in the rolling members. The relationship is best illustrated in Figure 12 in which the angle alpha indicates the deflection of one of the planet rollers 111 from its normal position, and it is the effort of the roller's resilient portion 114 to force the roller into its normal position that provides the necessary pressure. As in the first embodiment it is desirable that the greatest pressure be present at those rollers which rotate at the slowest speed and, accordingly, the resilient bodies 114 of the sun rollers 111 nearest the drive shaft 17 are made of greatest thickness. This thickness is decreased by curving the resilient bodies inwardly in gradations as the trains approach the forward end until, as is noted from a comparison of the planet rollers 111 at the head end of the casing, the resilient body 114 is of much less thickness than it is in the roller 111 nearest the motor 16.

In the present embodiment axial thrust is not relied upon to provide the take-up to compensate for wear and, accordingly, the spring 61 of the first embodiment is eliminated. Similarly, the driving cup 116 which replaces the sun roller in the planet carrier nearest the shaft 17 need not be provided with a helical slot as in the first embodiment. Power is again transmitted through balls 47 receiving their power, as in the first embodiment, from the narrowed shaft wall 38, which, in the present case, need not extend helically.

The operation of this second embodiment of the invention is believed to be clear and is in all respects similar to that first described with the exception that looseness or play which may develop or be present as a result of wear or temperature changes is taken up by the inherent tendency of the planet rollers 111 to assume positions which are truly concentric to their supporting shafts 102. The resilient bodies in each roller provide not only the take-up means but also the pressure necessary for the driving relationship between the surfaces with which they roll in contact. As in the first embodiment, power is transmitted from shaft 17 through the successive roller trains, the rotational speed increasing with each train. The final functional result comprising the vibration of the cutting end of the razor by the rotation of the vibrator-governor 19 is as described in connection with the first embodiment.

Referring now to Figure 16 in particular, a modified construction comprising the third embodiment of the invention is illustrated and is like the second embodiment with the exception that in place of the inclined shafts 102 supporting the planet rollers 111 each planet carrier 101 is provided with a planet-carrying shaft 121 extended parallel to its own supporting axis 104. Each roller, here indicated by the reference character 122, again comprises a metallic rim 123 having a curved outer surface and which is spaced from the central metallic sleeve bearing 124 by a resilient body 126. In the present instance the curvature of the rim 123 is such that the diametrical distance between the points of maximum diameter is greater than the distance which separates the cooperating sun roller 103 from the enclosing casing 11. It follows that the planet roller 122 can be positioned between the sun roller and the enclosing casing only by being tilted through the angle beta as illustrated. When so tilted diametrically apposed contacting points are separated by a distance equal to the distances between the casing and the sun roller and the unit is operative. The resilient intermediate body 126 of each roller at all times attempts to move the roller into a plane normal to the supporting shaft 121, and in doing so exerts the necessary driving pressure between the casing and the cooperating sun roller and also providing means to take up any wear which may occur in the parts.

While the epicyclic mechanism has been disclosed and its operation explained in connection with a vibratory razor it is to be understood that this is only one example of its usefulness, and that it can be applied in any field in which it is desired to transmit power with a minimum of frictional loss coupled with the ability to compensate for wear on the parts. While the particular constructions herein shown and described in detail are fully capable of attaining the objects and providing the advantages hereinbefore stated, it is to be understood that they are merely illustrative of the presently preferred embodiment of the invention and that no limitations are intended as to the details of construction or design herein shown except as defined in the appended claims.

I claim:

1. In an epicyclic mechanism, a plurality of cooperating longitudinally arranged roller trains having a common axis, each comprising a planet carrier, a planet roller and a sun roller, said planet roller having a shaft rotatable in said carrier and a rolling surface generated by the rotation of a curve about said shaft as an axis, the sun roller of all but the end train being fixed for rotation and longitudinal displacement with the carrier of an adjacent train and being in contact with said planet roller and having a rolling surface generated by the rotation of a curve about its axis of rotation, a stationary enclosing cylindrical surface for each of said trains spaced from the surface of its sun roller, the rolling surfaces of said planet and sun rollers being so contoured as to be adapted to make rolling contact in a plurality of relative positions in certain of which the effective diameter of said planet roller plus the effective radius of said sun roller is greater than the radius of the enclosing cylindrical surface, and means at the ends of said cooperating roller trains to exert opposite forces to wedge the planet rollers of said trains between the sun roller with which it cooperates and said cylindrical surface.

2. The construction defined in claim 1 characterized in that a single concentric cylindrical surface encloses said plurality of roller trains and in that said trains are positioned therein by the contact of their planet rollers with said cylindrical surface and with the sun roller of an adjacent roller train.

3. The construction recited in claim 1 characterized in that said planet roller is mounted for radial translation in its planet carrier.

4. In an epicyclic mechanism, a plurality of cooperating roller trains, comprising a planet carrier, a planet roller including a shaft rotatable in and radially movable in said carrier and a sun roller fixed to the planet carrier of an adjacent train, an enclosing concentric cylindrical surface of fixed diameter for each of said trains spaced from the surface of its sun roller, the cooperating planet roller and sun roller of each train being so contoured externally as to be adapted to make rolling contact in a plurality of relative axial positions, the effective diameter of said planet roller plus the effective radius of said sun roller increasing upon said planet roller shifting in one direction relative to its cooperating sun roller, and means to exert a force to effect an axial shifting of adjacent roller trains in a direction to change the relative positions of cooperating planet and sun rollers to increase the total of the effective diameter of a planet roller and the effective radius of a sun roller with which it cooperates.

5. In an epicyclic mechanism, a plurality of cooperating roller trains comprising a planet carrier including axially spaced radially extending elements, a planet roller positioned between said carrier elements and having stub shafts extending axially and rotatable and radially movable in said elements and a sun roller fixed to the planet carrier of an adjacent train, an enclosing concentric cylindrical surface for each of said trains spaced from the surface of its sun roller, the planet roller and the cooperating sun roller of each train being so contoured externally as to be adapted to make rolling contact in a plurality of relative axial positions, the effective diameter of said planet roller plus the effective radius of said sun roller increasing as said planet roller shifts in one direction relative to said sun roller, and resilient means exerting a force upon the roller train at the end of said mechanism to effect an axial shifting of adjacent roller trains in said one direction to change the relative positions of cooperating planet and sun rollers.

6. In an epicyclic mechanism, a plurality of cooperating roller trains comprising a planet carrier, planet rollers, including shafts by which they are rotatably mounted on said carrier, and a sun roller fixed to the carrier of an adjacent train, the sun roller of one train contacting the planet rollers of that train and being shiftable axially relative thereto, a concentric surface enclosing said trains, the cooperating surfaces of said sun rollers and planet rollers being shaped so that the axial displacement of adjacent roller trains in one direction tends to force said planet rollers outwardly against said concentric surface, and means to exert a force to urge said roller trains in said one direction.

7. The construction recited in claim 6 characterized in that said planet roller shafts mount said planet rollers for radial displacement in said planet carriers.

8. The construction recited in claim 7 characterized in that said planet carrier is in each instance formed with a bearing for the shaft of the roller which it supports, the bearing being larger than the shaft of the roller to permit said roller to shift radially, a thrust ball abutting the end of said shaft in position to transmit a force from said carrier.

9. In an epicyclic mechanism, a rotary unbalanced mass, a spring motor, a cylindrical casing adapted to receive at one end the shaft of said motor, a plurality of adjacent roller trains within said casing including a planet carrier formed of spaced plates, a plurality of planet rollers including shafts mounted in said plates for rotation, and a sun roller fixed to the carrier of an adjacent train and arranged to contact the planet rollers of its own train, the cooperating surfaces being so contoured that a relative axial shifting of said sun and planet rollers effects the radial displacement of said planet rollers toward or from said casing, means to connect an end planet carrier to said motor shaft, and means to connect the sun roller of the train at the opposite end to said unbalanced mass.

10. The structure recited by claim 9 characterized in that said means to connect an end planet carrier to said motor shaft includes a sleeve secured to said end planet carrier concentric to said shaft and formed with a helically extending groove, a ball positioned in said groove, and means on said shaft to effect the revolution of said ball about the axis of the shaft upon shaft rotation, the movement of said ball imparting an axial thrust to said sleeve and to the connected carrier.

11. In an epicyclic mechanism, a stationary enclosing cylindrical casing, a plurality of series of planet rollers, each series comprising a plurality of circumferentially spaced planet rollers formed individually with a stub shaft and with rolling surfaces spaced at different distances from their axes of rotation, a carrier for each of said series of rollers seating said stub shafts for limited radial displacement in circumferentially spaced relationship, each carrier including means to exert a longitudinal force on the stub shafts it seats, a sun roller for each series of planet rollers in contact therewith and fixed to the carrier of the adjacent series save in the case of the last sun roller, each of said sun rollers being contoured to force the planet rollers contacted by it toward said enclosing cylindrical casing upon relative movement bringing the adjacent trains closer together, and means to apply a longitudinal force to an end carrier to force said trains toward each other in the presence of the opposing force at the opposite end.

12. The construction recited in claim 11 characterized in that the end carrier carries a ball cup rather than a sun roller, and in that a shaft including longitudinally extending surfaces extends therein and is connected to said cup by a plurality of balls, the rotation of said shaft exerting a longitudinal force upon said cup.

13. The construction recited in claim 12 characterized in that said surfaces on said shaft extend helically.

14. In an epicyclic mechanism, an enclosing casing internally cylindrical, spaced roller trains arranged within said cylinder, each including a plurality of planet rollers formed with rolling surfaces at varying distances from their axes of rotation, means mounting said planet rollers for rotation for limited radial displacement, and maintaining said rollers in circumferentially spaced relationship, and a sun roller fixed to and axially movable with said last-mentioned means of an adjacent train and contacting the planet rollers of its own train, said sun roller increasing gradually in diameter in the direction of said means to which it is connected to effect the outward wedging of the contacted planet rollers upon decrease in the distance separating adjacent trains.

15. In an epicyclic mechanism, a roller train comprising a planet carrier, a planet roller having a supporting shaft and a rolling surface generated by the rotation of a curve about said shaft as an axis, a sun roller in contact with said planet roller having a rolling surface generated by the rotation of a curve about its axis of rotation, a stationary enclosing cyclindrical surface for said train spaced from said sun roller by a distance less than the maximum diameter of said planet roller, and means exerting a force to wedge said planet roller between said sun roller and said cylindrical surface.

16. In an epicyclic mechanism, a plurality of cooperating adjacent axially aligned roller trains comprising a planet carrier, a planet roller carried by said carrier and radially displaceable thereon and a sun roller fixed to the planet carrier of an adjacent train, said planet roller and said sun roller being shiftable axially relative to each other, an enclosing concentric cylindrical surface for each of said trains spaced from the surface of its sun roller, the planet roller and the cooperating sun roller of each train being so contoured externally as to be adapted to make rolling contact in a plurality of relative axial positions, and to cam said planet roller radially outwardly upon said planet roller being shifted in one direction relative to its cooperating sun roller, and driving means exerting a rotating torque upon the roller train at one end of said mechanism and including means to provide an axial force to effect an axial shifting of adjacent roller trains to change the relative positions of cooperating planet and sun rollers.

RUSSELL P. HARSHBERGER.

REFERENCES CITED

The following references are of record in the file of this patent:

UNITED STATES PATENTS

| Number | Name | Date |
|---|---|---|
| 1,298,560 | Poppink | Mar. 25, 1919 |
| 1,368,570 | Philippeau | Feb. 15, 1921 |
| 1,986,177 | Zatoupil | Jan. 1, 1935 |
| 2,131,787 | Rockwell | Oct. 4, 1938 |
| 2,293,407 | Schirrmeister | Aug. 18, 1942 |
| 2,344,078 | Brissonet | Mar. 14, 1944 |
| 2,362,998 | Harshberger | Nov. 21, 1944 |